United States Patent
Wang

(10) Patent No.: US 9,203,509 B2
(45) Date of Patent: Dec. 1, 2015

(54) METHOD, SYSTEM, AND APPARATUS FOR DETECTING OPTICAL POWER OF PASSIVE OPTICAL NETWORK

(71) Applicant: HUAWEI TECHNOLOGIES CO., LTD., Shenzhen (CN)

(72) Inventor: Ying Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 165 days.

(21) Appl. No.: 13/908,218

(22) Filed: Jun. 3, 2013

(65) Prior Publication Data
US 2013/0259471 A1  Oct. 3, 2013

Related U.S. Application Data

(63) Continuation of application No. PCT/CN2011/079723, filed on Sep. 16, 2011.

(30) Foreign Application Priority Data

Dec. 3, 2010  (CN) .......................... 2010 1 0572392

(51) Int. Cl.
*H04B 10/272* (2013.01)
*H04B 10/07* (2013.01)
*H04B 10/079* (2013.01)
*H04Q 11/00* (2006.01)

(52) U.S. Cl.
CPC .......... *H04B 10/07* (2013.01); *H04B 10/07955* (2013.01); *H04B 10/272* (2013.01); *H04Q 11/0067* (2013.01); *H04Q 2011/0083* (2013.01)

(58) Field of Classification Search
CPC .................................. H04B 10/08; H04Q 11/00
USPC ............................................................ 398/38
See application file for complete search history.

(56) References Cited

U.S. PATENT DOCUMENTS

| | | | |
|---|---|---|---|
| 5,838,476 A | 11/1998 | Harasawa et al. | |
| 6,313,459 B1 | 11/2001 | Hoffe et al. | |
| 2002/0027689 A1* | 3/2002 | Bartur ..................... | H04B 10/40 398/139 |
| 2006/0220664 A1 | 10/2006 | Stellari et al. | |

(Continued)

FOREIGN PATENT DOCUMENTS

| | | |
|---|---|---|
| CN | 101217310 A | 7/2008 |
| CN | 101258503 A | 9/2008 |

(Continued)

OTHER PUBLICATIONS

Extended European Search Report dated Feb. 6, 2014 in corresponding European Patent Application No. 11845135.0.

(Continued)

*Primary Examiner* — David Payne
*Assistant Examiner* — Omar S Ismail
(74) *Attorney, Agent, or Firm* — Staas & Halsey LLP

(57) ABSTRACT

The present invention disclose an apparatus for detecting an optical power of a passive optical network, where the apparatus includes: a detecting module is configured to measure an RSSI of a received optical signal; and a controller is configured to output the RSSI function trigger signal to the detecting module, selectively receive, an RSSI measurement result output by an RSSI detection branch, and calculate optical power information of the optical signal according to the RSSI measurement result.

19 Claims, 6 Drawing Sheets

(56) References Cited

U.S. PATENT DOCUMENTS

| | | | |
|---|---|---|---|
| 2007/0023615 A1* | 2/2007 | Ruegg | G01J 1/44 250/214 R |
| 2007/0058989 A1* | 3/2007 | Kaku | H04B 10/672 398/209 |
| 2009/0050791 A1* | 2/2009 | Teeter | H03F 3/087 250/214 R |
| 2009/0175619 A1 | 7/2009 | Effenberger et al. | |

FOREIGN PATENT DOCUMENTS

| | | |
|---|---|---|
| CN | 102130720 A | 7/2011 |
| EP | 2634933 A1 | 9/2013 |
| JP | 2007189294 | 7/2007 |
| WO | 2007/030700 | 3/2007 |

OTHER PUBLICATIONS

International Search Report mailed on Dec. 22, 2011 in corresponding Chinese International Application No. PCT/CN2011/079723.

PCT Written Opinion of International Searching Authority mailed Dec. 22, 2011 in corresponding International Application No. PCT/CN2011/079723.

Chinese Office Action mailed Aug. 3, 2012 in corresponding Chinese Application No. 201010572392.0.

Chinese Office Action mailed Mar. 27, 2013 in corresponding Chinese Application No. 201010572392.0.

Randy Clark et al., "Diagnostic Monitoring Interface for Optical Transceivers", SFF Committee, SFF-8472, Rev 10.3, Dec. 1, 2007, pp. 1-36.

* cited by examiner

METHOD, SYSTEM, AND APPARATUS FOR DETECTING OPTICAL POWER OF PASSIVE OPTICAL NETWORK

CROSS-REFERENCE TO RELATED APPLICATIONS

This application is a continuation of International Application No. PCT/CN2011/079723, filed on Sep. 16, 2011, which claims priority to Chinese Patent Application No. 201010572392.0, filed on Dec. 3, 2010, both of which are hereby incorporated by reference in their entireties.

TECHNICAL FIELD

The present invention mainly relates to passive optical network technologies, and in particular, to a method, a system, and an apparatus for detecting an optical power of a passive optical network.

BACKGROUND

As the "replacement of copper cables with optical fiber cables" gradually becomes a mainstream access mode in network technologies, the application of optical access technologies flourishes. A passive optical network (Passive Optical Network, PON) technology is an optical access technology based on point to multipoint (Point to MultiPoint, P2MP). A passive optical network system mainly includes an optical line terminal (Optical Line Terminal, OLT) located at a central office, multiple optical network units (Optical Network Unit, ONU) on a user side, and an optical distribution network for distributing or multiplexing data signals between the optical line terminal and an optical network unit. A direction from the optical line terminal to the optical network unit is defined as a downlink direction, while a direction from the optical network unit to the optical line terminal is defined as an uplink direction. The optical line terminal sends a downlink optical signal to the optical network unit and receives an uplink optical signal from the optical network unit through the optical distribution network.

In an actual application environment, to reduce maintenance costs, a receiving part and a sending part for photoelectric conversion inside the optical line terminal are normally grouped as a pluggable module and a receiving part and a sending part for photoelectric conversion inside the optical network unit are normally grouped as a pluggable module in the industry, namely, an optical module. An optical module of the optical line terminal may also have partial monitoring functions, such as an optical power detecting function, so that the optical line terminal may perform fault monitoring and fault location. Specifically, when an transmit optical power of an optical network unit is P1 (the transmit optical power value P1 may be reported by the optical network unit to the optical line terminal), the optical module of the optical line terminal may obtain, by using the monitoring function thereof, an optical power P2 of an uplink optical signal received thereby from the optical network unit and transmitted through the optical distribution network. That is, a receive optical power corresponding to the optical network unit is P2. Then, the optical line terminal may calculate an insertion loss A=P1−P2 of the optical network unit. Further, the optical line terminal may compare the calculated insertion loss value A with a theoretically standard value of a system insertion loss, to determine whether a fault occurs on the optical distribution network.

However, because optical power measurement accuracy of an optical module is limited in the prior art, there may be a certain difference between the receive optical power value P2 of the optical network unit obtained by optical power detection and an actual receive optical power value, which may result in a big difference between the insertion loss value A calculated and obtained by the optical line terminal and an actual system insertion loss value, thereby causing the optical line terminal to make an incorrect judgment on a fault condition of the optical distribution network.

SUMMARY

In view of this, embodiments of the present invention provide an apparatus and a method for detecting an optical power of a passive optical network, a passive optical network system, and an optical module, which solves the above problem.

An apparatus for detecting an optical power of a passive optical network includes: a receiving module configured to receive an optical signal sent by an optical network unit; a detecting module which includes a current mirror RSSI detection branch and a logarithmic amplifier RSSI detection branch, where the current mirror RSSI detection branch and the logarithmic amplifier RSSI detection branch are coupled to the receiving module, and configured to measure, according to a received RSSI function trigger signal, an RSSI of an optical signal received by the receiving module; and a controller which is coupled to the detecting module and configured to output the RSSI function trigger signal to the detecting module, selectively receive, according to a selection control signal provided by a selection control signal generating module, an RSSI measurement result output by an RSSI detection branch corresponding to optical strength of the optical signal sent by the optical network unit, and calculate optical power information of the optical signal according to the RSSI measurement result.

A method for detecting an optical power of a passive optical network includes: receiving an optical signal sent by an optical network unit; sending an RSSI function trigger signal to a detecting module which at least includes a current mirror RSSI detection branch and a logarithmic amplifier RSSI detection branch, to instruct the current mirror RSSI detection branch and the logarithmic amplifier RSSI detection branch to measure an RSSI of the optical signal received by a receiving module; receiving a selection control signal provided by a selection control signal generating module; and selectively receiving, according to the selection control signal, an RSSI measurement result output by an RSSI detection branch corresponding to optical strength of the optical signal sent by the optical network unit, and calculating optical power information of the optical signal according to the RSSI measurement result.

An optical module includes: a receiving module configured to receive an optical signal; a detecting module which includes a current mirror RSSI detection branch and a logarithmic amplifier RSSI detection branch, where the current mirror RSSI detection branch and the logarithmic amplifier RSSI detection branch are coupled to the receiving module, and configured to measure an RSSI of the optical signal in response to an RSSI function trigger signal received thereby, and selectively output an RSSI measurement result output by an RSSI detection branch corresponding to optical strength of the optical signal.

A passive optical network system includes an optical line terminal and multiple optical network units connected in a point to multipoint mode through an optical distribution network, where an optical network unit is configured to send an optical signal to the optical line terminal through the optical distribution network, the optical line terminal is configured to receive the optical signal sent by the optical network unit, measure an RSSI of the optical signal by using an internal current mirror RSSI detection branch and a logarithmic amplifier RSSI detection branch thereof, select an RSSI measurement result output by an RSSI detection branch corresponding to optical strength of the optical signal sent by the optical network unit, and calculate optical power information of the optical signal according to the selected RSSI measurement result.

Compared with the prior art, in the method, system, and apparatus for detecting an optical power provided by the embodiments of the present invention, a current mirror RSSI detection branch and a logarithmic amplifier RSSI detection branch are configured inside an optical module to measure an RSSI of a received optical signal, and a measurement result of a corresponding RSSI detection branch is selected according to strength of the optical signal to calculate optical power information, thereby integrating advantages of measurement accuracy of the current mirror RSSI detection branch and the logarithmic amplifier RSSI detection branch for different optical strength, ensuring measurement accuracy of a receive optical power, and efficiently avoiding that an optical line terminal makes an incorrect judgment on a fault condition of an optical distribution network.

DESCRIPTION OF EMBODIMENTS

The method, system, and apparatus for detecting an optical power of a passive optical network according to embodiments of the present invention are described in detail as follows with reference to specific embodiments.

Figure 1:
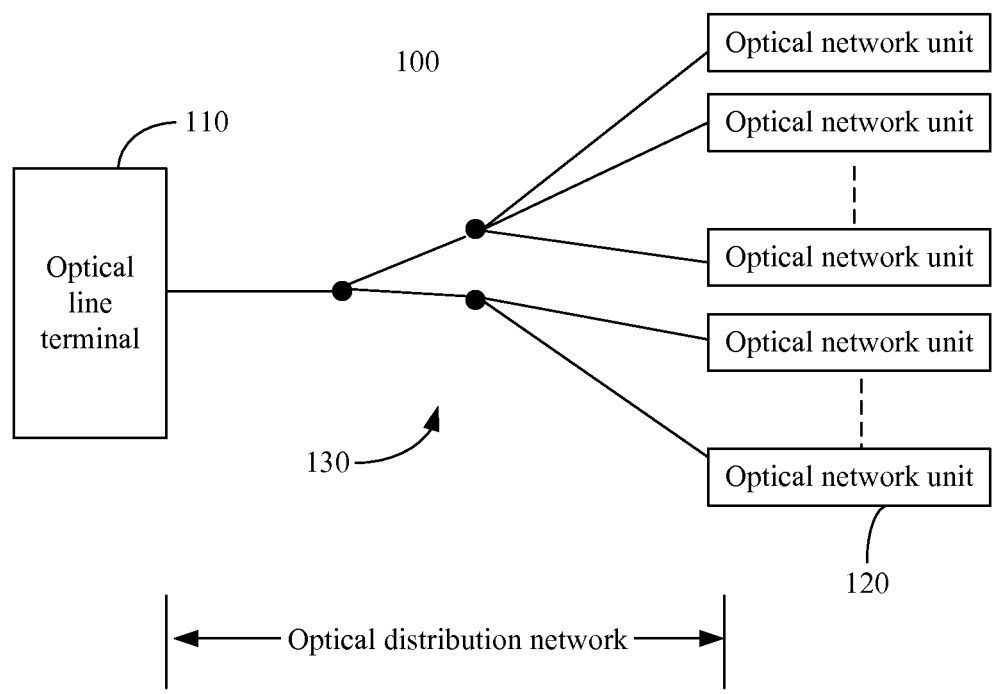
FIG. 1 is a schematic structural diagram of a passive optical network system.

FIG. 1 is a schematic structural diagram of a passive optical network system where a solution for detecting an optical power according to an embodiment of the present invention may be used. A passive optical network system 100 includes at least one optical line terminal 110, multiple optical network units 120, and one optical distribution network 130. The optical line terminal 110 is connected to the multiple optical network units 120 in a point to multipoint mode through the optical distribution network 130, where a direction from the optical line terminal 110 to the optical network units 120 is defined as a downlink direction, and a direction from the optical network units 120 to the optical line terminal 110 is defined as an uplink direction.

The passive optical network system 100 may be a communication network which requires no active device which is used for implementing data distribution between the optical line terminal 110 and the optical network units 120. For example, in a specific embodiment, data distribution between the optical line terminal 110 and the optical network units 120 may be implemented by using a passive optical device (such as an optical splitter) in the optical distribution network 130. Further, the passive optical network system 100 may be an asynchronous transfer mode passive optical network (ATM PON) system or a broadband passive optical network (BPON) system defined by the ITU-T G.983 standard, a gigabit-capable passive optical network (GPON) system defined by the ITU-T G.984 standard, an ethernet passive optical network (EPON) defined by the IEEE 802.3ah standard, or a next generation passive optical network (NGA PON, such as XGPON or 10G EPON). All content of various passive optical network systems defined by the above standards is incorporated herein by reference in their entireties.

The optical line terminal 110 is normally located at a central location (for example, a central office Central Office, CO), and may manage multiple optical network units 120 in a unified way and transfer data between the optical network units 120 and an upper layer network (not shown in the figure). Specifically, the optical line terminal 110 may be the medium between the optical network units 120 and the upper layer network to forward data, received from the upper layer network, to the optical network units 120 and forward data, received from the optical network units 120, to the upper layer network. The specific structural configuration of the optical line terminal 110 may vary with a specific type of the passive optical network 100. For example, in an embodiment, an optical line terminal 110 may include a downlink sending module and an uplink receiving module, where the downlink sending module is configured to send a downlink optical signal to an optical network unit, and the uplink receiving module is configured to receive an uplink optical signal from the optical network unit, where the downlink optical signal and the uplink optical signal may be transferred through the optical distribution network. Further, the downlink sending module and the uplink receiving module may be configured as an independent pluggable optical module. In addition, in a specific embodiment, the optical module may further include a detecting module which may be configured to detect performance parameters of the optical module, including detecting an operating voltage, a transmit optical power, a receive optical power, and the like, of the optical module.

The optical network units 120 may be distributed at locations on a user side (such as customer premises). The optical network unit 120 may be a network equipment configured to communicate with the optical line terminal 110 and a user. Specifically, the optical network unit 120 may be the medium between the optical line terminal 110 and the user. For example, the optical network unit 120 may forward data, received from the optical line terminal 110, to the user, and forward data, received from the user, to the optical line terminal 110. Similarly, the specific structural configuration of the optical network unit 120 may vary with a specific type of the passive optical network 100. For example, in an embodiment, the optical network unit 120 may also include an uplink sending module and a downlink receiving module, where the uplink sending module is configured to send an uplink optical signal to the optical line terminal, and the downlink receiving module is configured to receive a downlink optical signal from the optical line terminal. Further, the uplink sending module and the downlink receiving module may also be configured as an independent pluggable optical module, and the optical module may also be further integrated with a detecting function. It should be understood that a structure of the optical network unit 120 is similar to that of an optical network terminal (Optical Network Terminal, ONT). Therefore, an optical network unit and an optical network terminal are interchangeable in a solution provided herein.

The optical distribution network 130 may be a data distribution system, which may include an optical fiber, an optical coupler, an optical splitter, and/or other devices. In an embodiment, the optical fiber, optical coupler, optical splitter, and/or other devices may be passive optical devices. Specifically, the optical fiber, optical coupler, optical splitter, and/or other devices may be devices which distribute data between the optical line terminal 110 and the optical network unit 120 and require no electrical power support. In addition, in another embodiment, the optical distribution network 130 may further include one or more processing devices, such as an optical amplifier or a relay device (Relay device). In a branch structure shown in FIG. 1, the optical distribution network 130 may specifically extend from the optical line terminal 110 to the multiple optical network units 120, or may be configured to be another point-to-multipoint structure.

Figure 2:
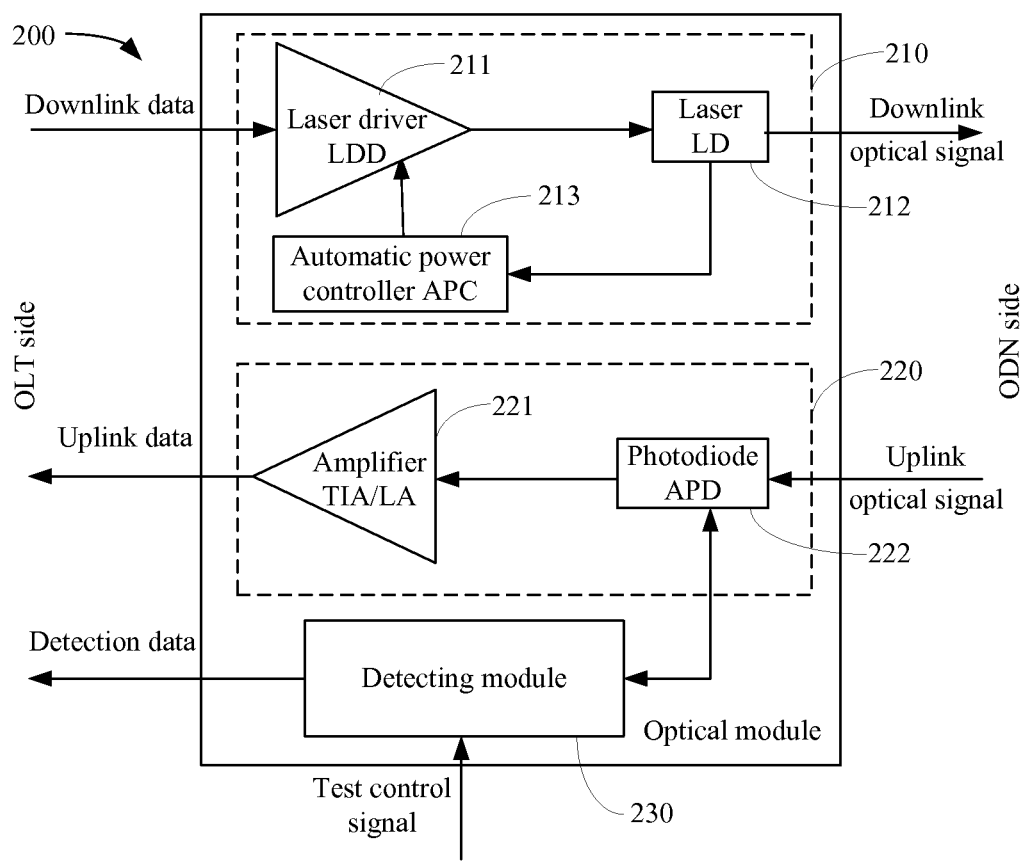
FIG. 2 is a schematic structural diagram of an optical module of an optical line terminal according to an embodiment of the present invention.

As described above, the optical line terminal 110 may include a pluggable optical module integrating a function of receiving and sending an optical signal and a photoelectric conversion function and a detecting function. A schematic structural diagram of an optical module of an optical line terminal 110 according to the embodiment is described in detail with reference to FIG. 2. As shown in FIG. 2, in an embodiment, an optical module 200 includes a sending module 210, a receiving module 220, and a detecting module 230.

The sending module 210 is configured to receive downlink data, convert the downlink data into a downlink optical signal, and deliver the downlink optical signal to the optical network unit 120 through the optical distribution network 130. In a specific embodiment, the sending module 210 may include a laser driver (Laser Diode Device, LDD) 211, a laser diode (Laser Diode, LD) 212, and an automatic power controller (Automatic Power Controller, APC) 213 that is coupled between the laser driver 211 and the laser 212. The laser driver 211 receives downlink data, and drives the laser 212 to convert the downlink data into an optical signal (that is, a downlink optical signal) and deliver the optical signal to the optical network unit 120. The automatic power controller 213 controls an output optical power of the optical module 200 to be stable by using a closed loop. For example, the automatic power controller 213 may detect a photocurrent of the laser 212, and automatically adjust a bias current according to the detected photocurrent, so that the output optical power of the sending module 210 remains stable.

The receiving module 220 is configured to receive an uplink optical signal transferred through the optical distribution network 130 by the optical network unit 120, convert the uplink optical signal into an electrical signal through photoelectric conversion, and forward the electrical signal to a control part or a data processing part (not shown in the figure) of the optical line terminal 110 for processing. In a specific embodiment, the receiving module 220 may include a photodiode (Avalanche photodiode, APD) 222 and an amplifier 221. The photodiode 222 receives the uplink optical signal and converts the uplink optical signal into an electrical signal. The amplifier 221 may include a transimpedance amplifier (Trans-impedance Amplifier, TIA) and/or an amplitude-limiting amplifier (Limiting Amplifier, LA), and may amplify the electrical signal provided by the photodiode 222 to form a digital signal with a constant amplitude and provide the digital signal to the data processing part of the optical line terminal 110 for processing, for example, for clock and data recovery processing (Clock and Data Recovery, CDR) and subsequent relevant data processing. In addition, in other alternative embodiments, a clock and data recovery function may also be integrated in the receiving module 220.

It should be understood that FIG. 2 only illustrates main functional modules of the sending module 210 and the receiving module 220. In a specific embodiment, the two modules may further include other functional units. For example, the sending module 210 may further include a photocurrent detecting unit and a temperature control unit.

The detecting module 230 may be coupled to the receiving module 220, and may detect the received performance parameters (including a receive optical power) of the optical module 200 under the control of a device controller (not shown in the figure) of the optical line terminal 110, and provide detection data to the device controller. In an embodiment, as shown in FIG. 2, the detecting module 230 may be coupled to the photodiode 222 of the receiving module 220. The detecting module 230 may receive a test control signal provided by the device controller, such as a received signal strength indication (Received Signal Strength Indication, RSSI) function trigger signal (RSSI_Trigger signal for short), measure an RSSI under the control of the test control signal to detect a receive optical power of the photodiode 222, and provide obtained detection data to the device controller. In addition, the detecting module 230 may be coupled to the sending module 210 to detect the transmit performance parameter (such as a transmit optical power) of the optical module 200, and in a specific embodiment, the detecting module 230 may also detect other performance parameters (such as an operating voltage of the optical module 200) of the optical module 200.

Figure 3:
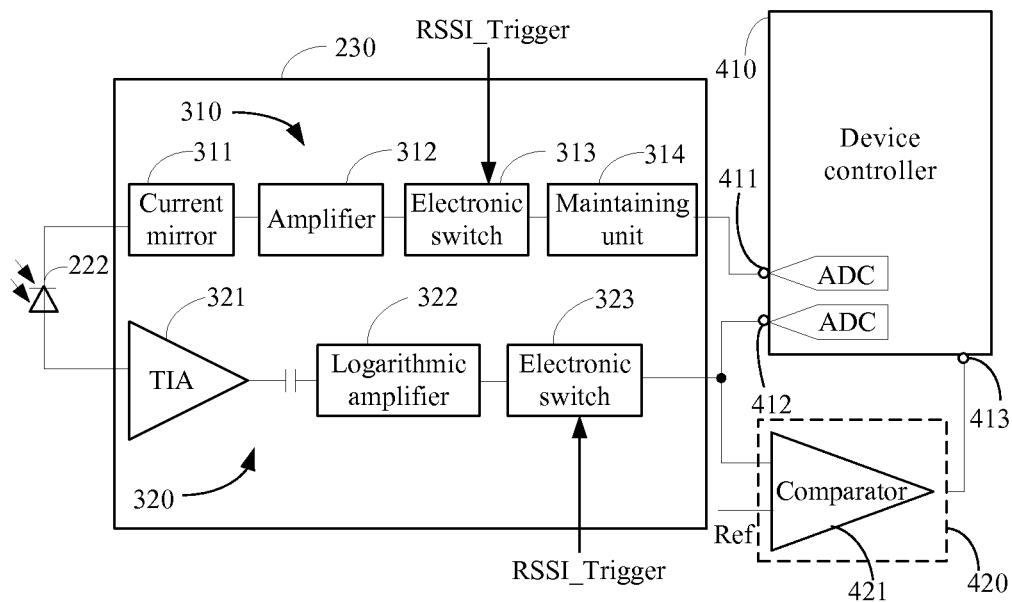
FIG. 3 is a schematic structural diagram of modules of an optical power detecting functional part of an optical line terminal according to an embodiment of the present invention.

FIG. 3 is a schematic structural diagram of a receive optical power detecting functional part of an optical line terminal 110 according to an embodiment of the present invention. The optical power detecting functional part includes a device controller 410 of the optical line terminal and the detecting module 230. The detecting module 230 may be equipped with at least two sets of RSSI information measurement solutions corresponding to different optical strength, respectively, and the device controller 410 of the optical line terminal 110 may selectively receive, according to strength of the optical signal received by the photodiode 222 of the receiving module 220, a result of measuring, by a suitable RSSI measurement solution, an RSSI of the optical signal received by the photodiode 222, thereby detecting a receive optical power of the photodiode 222 of the receiving module 220.

As shown in FIG. 3, in an embodiment, the receive optical power detecting functional part includes a current mirror RSSI detection branch 310 and a logarithmic amplifier (Logarithmic Amplifier, LOG) RSSI detection branch 320, where the input end of the current mirror RSSI detection branch 310 and the input end of the logarithmic amplifier RSSI detection branch 320 are both coupled to the photodiode 222, and the output end of the current mirror RSSI detection branch 310 and the output end of the logarithmic amplifier RSSI detection branch 320 are coupled to an analog-to-digital converter (Analog-to-Digital Converter, ADC) of the device controller 410 through a first detection port 411 and a second detection port 412 of the device controller 410, respectively. In addition, the output end of the logarithmic amplifier RSSI detection branch 320 is further coupled to a selection controlling end 413 of the device controller 410 through a comparison circuit 420.

The current mirror RSSI detection branch 310 may include a circuit mirror 311, an amplifier 312, an electronic switch 313, and a maintaining unit 314, where the circuit mirror 311, the amplifier 312, the electronic switch 313, and the maintaining unit 314 are connected in sequence between the photodiode 222 and the first detection port 411. The photodiode 222 may generate a corresponding photocurrent according to an optical signal received by the photodiode 222. When the device controller 410 selects the current mirror RSSI detection branch 310 to measure an RSSI, the current mirror 311 may collect the photocurrent and sends it to the amplifier 312 for amplification. The electronic switch 313 may be conducted under the control of an RSSI function trigger (RSSI_Trigger) signal provided by the device controller 410 and enable the maintaining unit 314 to start operating. Further, after the delay of a preset period, the analog-to-digital converter of the device controller 410 may sample the output of the current mirror RSSI detection branch 310 through the first detection port 411, and convert it into a corresponding digital quantity, thereby obtaining RSSI information of the optical signal received by the receiving module 220.

The logarithmic amplifier RSSI detection branch 320 may include a transimpedance amplifier (TIA) 321, a logarithmic amplifier 322, and an electronic switch 323, where the transimpedance amplifier 321, the logarithmic amplifier 322, and the electronic switch 323 are connected in sequence between the photodiode 222 and the second detection port 421. When the device controller 410 selects the logarithmic amplifier RSSI detection branch 320 to measure an RSSI, the transimpedance amplifier 321 may preamplify the photocurrent provided by the photodiode 222, and the logarithmic amplifier 322 may further perform logarithmic amplification processing on the preamplified signal. In addition, the electronic switch 323 may be conducted under the control of an RSSI_Trigger signal provided by the device controller 410. Further, after the delay of a preset period, the analog-to-digital converter of the device controller 410 may sample the output of the logarithmic amplifier RSSI detection branch 320 through the second detection port 412, and convert it into a corresponding digital quantity, thereby obtaining RSSI information of the optical signal received by the receiving module 220.

When the optical strength of the optical signal received by the photodiode 222 is large (that is, a large optical input), accuracy of the RSSI information measured by using the current mirror RSSI detection branch 310 is high. However, when the optical strength of the received optical signal is small (that is, a small optical input), because the amplifier 312 of the current mirror RSSI detection branch 310 may be saturated, RSSI information measurement accuracy of the current mirror RSSI detection branch 310 may be affected. On the contrary, in a case of a small optical input, accuracy of the RSSI information measured by using the logarithmic amplifier RSSI detection branch 320 is high. However, in a case of a large optical input, because the transimpedance amplifier 321 of the logarithmic amplifier RSSI detection branch 320 normally has a fixed gain and the output of the amplifier may not vary with an input optical power, RSSI information measurement accuracy of the logarithmic amplifier RSSI detection branch 320 may be affected in the case of the large optical input. In another aspect, a response speed of the logarithmic amplifier RSSI detection branch 320 is higher than a response speed of the current mirror RSSI detection branch 310.

This embodiment sufficiently considers respective measurement accuracy features of the current mirror RSSI detection branch 310 and the logarithmic amplifier RSSI detection branch 320, takes the advantage of a high response speed of the logarithmic amplifier RSSI detection branch 320, and compares, by using the comparison circuit 420, an output signal of the logarithmic amplifier RSSI detection branch 320 with a preset reference signal Ref, to determine whether the current optical input is a large optical input or a small optical input. Further, the comparison circuit 420 may further output a selection control signal to the selection controlling end 413 of the device controller 410 according to a comparison result, to instruct the device controller 410 to select an RSSI measurement result output by the current mirror RSSI detection branch 310 in the case of a large optical input, and select an RSSI measurement result output by the logarithmic amplifier RSSI detection branch 320 in the case of a small optical input, thereby ensuring measurement accuracy of the receive optical power of the detecting module 230.

Specifically, in an embodiment, as shown in FIG. 3, the detecting module 230 may further include a comparison circuit 420, where the comparison circuit 420 includes a comparator 421, one input end of the comparator 421 is connected to an output end of the logarithmic amplifier RSSI detection branch 320, another input end of the comparator 421 receives a preset reference signal Ref, and an output end of the comparator 421 is connected to the selection controlling end 413 of the device controller 410. The comparison circuit 420 may be used as a selection control signal generating module, and is configured to generate, according optical strength of an optical signal received by the optical module 200, a selection control signal corresponding to the optical strength of the optical signal and provide the selection control signal to the device controller 410, to instruct the device controller 410 to selectively receive an RSSI measurement result of the suitable RSSI detection branch 310 or 320.

A value of the reference signal Ref may be determined according to an input optical power range of the photodiode 222, which may be selected and obtained within an optical power range according to an experimental result or according to experience, thereby ensuring that the value of the reference signal Ref is within the overlapping part between high measurement accuracy of the current mirror RSSI detection branch 310 and the logarithmic amplifier RSSI detection branch 320. Further, a suitable margin may be reserved in actual selection. The high measurement accuracy may specifically refer to that the reference signal Ref may be a voltage signal, and an optical strength value corresponding to the signal may enable both measurement errors of the current mirror RSSI detection branch and the logarithmic amplifier RSSI detection branch to be smaller than a preset error value (for example, ±2 dBm). Specifically, assuming that an optical strength range of transmit light of the optical network unit 120 in the passive optical network system 100 is −31 dBm to −6 dBm, that is, an optical strength range of an optical signal received by the photodiode 222 is −31 dBm to −6 dBm theoretically, a voltage value corresponding to optical strength −20 dBm may be selected for the reference signal Ref. Correspondingly, when optical strength of an optical signal received by the photodiode 222 is within a range from −31 dBm to −20 dBm, the selection control signal output by the comparator 421 may indicate that the current optical input is a small optical input, and then the analog-to-digital converter of the device controller 410 may select the current mirror RSSI detection branch 310 and read RSSI information output by the current mirror RSSI detection branch 310; while when optical strength of an optical signal received by the photodiode 222 is within a range from −20 dBm to −6 dBm, the selection control signal output by the comparator 421 may indicate that the current optical input is a large optical input, and then the analog-to-digital converter of the device controller 410 may select the logarithmic amplifier RSSI detection branch 320 and read RSSI information output by the logarithmic amplifier RSSI detection branch 320.

Figure 4:
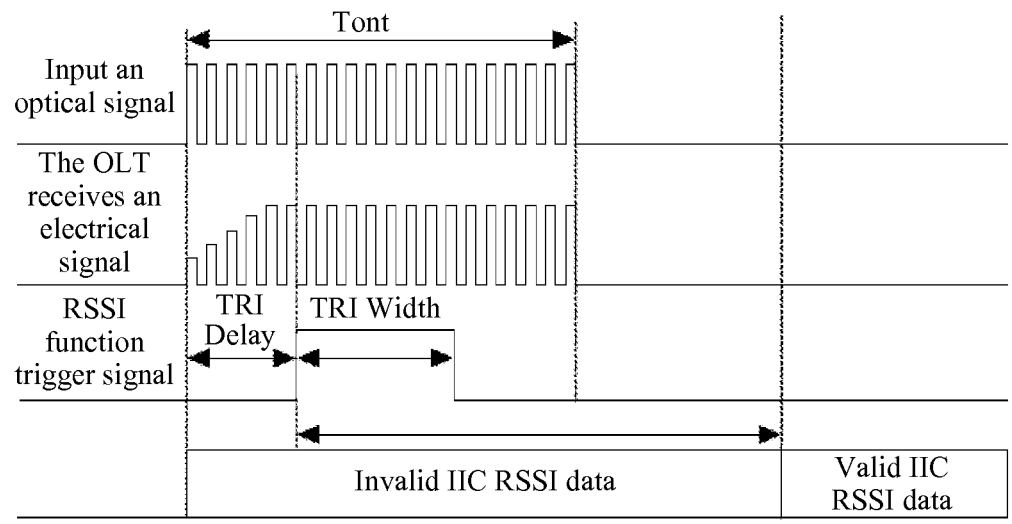
FIG. 4 is a schematic sequence diagram of a method for detecting an optical power according to an embodiment of the present invention.
Figure 5:
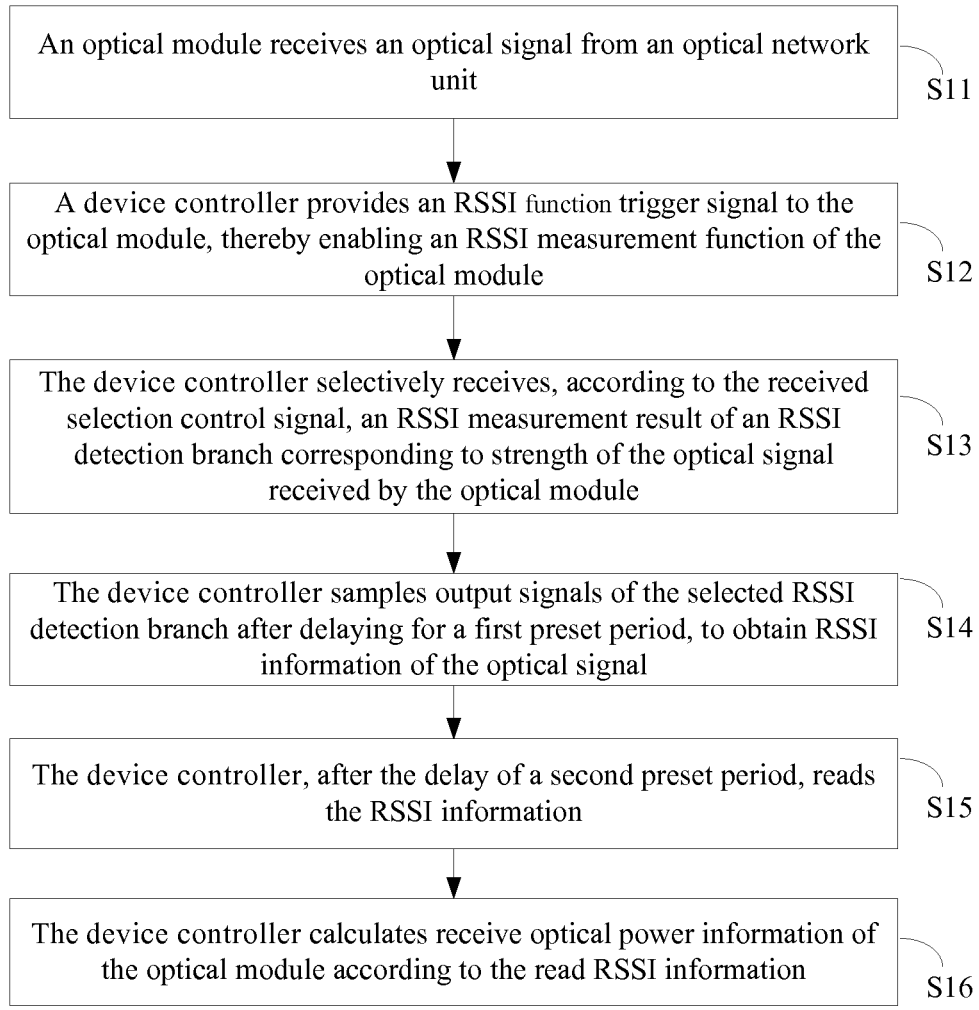
FIG. 5 is a flowchart of a method for detecting an optical power by using an optical power detecting functional part shown in FIG. 3 according to an embodiment of the present invention.

Based on the structure of the optical module 200 provided by FIG. 2 to FIG. 3, a method for detecting an optical power according to an embodiment of the present invention is described in the following with reference to FIG. 4 and FIG. 5. FIG. 4 is a schematic sequence diagram of a method for detecting an optical power according to an embodiment of the present invention. FIG. 5 is a flowchart of a method for detecting an optical power according to an embodiment of the present invention. The method for detecting an optical power includes the following steps.

Step S11: An optical module receives an optical signal from an optical network unit.

The optical network unit 120, as instructed by the optical line terminal 110, sends an uplink optical signal within a time slot Tont allocated by the optical line terminal 110, where the uplink optical signal may be transmitted to the optical line terminal 110 through the optical distribution network 130, received by the photodiode 222 inside the optical module 200 and converted into an electrical signal by the photodiode 222.

Step S12: The device controller provides an RSSI function trigger signal to the optical module, thereby enabling an RSSI measurement function of the optical module.

The device controller 410 of the optical line terminal 110 outputs an RSSI_Trigger signal to the optical module 200 within a time slot allocated to the optical network unit 120, to instruct the optical module 200 to enable an RSSI measurement function of a detecting module 230 thereof. The RSSI_Trigger signal may be simultaneously provided to the electronic switch 313 of the current mirror RSSI detection branch 310 and the electronic switch 323 of the logarithmic amplifier RSSI detection branch 320, so as to conduct the electronic switches 313 and 323. Further, to ensure accuracy of RSSI measurement, the RSSI_Trigger signal may be output to the optical module 200 after a TRI Delay period starting from a time slot of the optical network unit 120, where the TRI Delay time may be the time required by the photodiode 222 of the optical module 200 for receiving an optical signal and performing photoelectric conversion.

Step S13: The device controller selectively receives, according to the received selection control signal, an RSSI measurement result of an RSSI detection branch corresponding to strength of the optical signal received by the optical module.

Because a response speed of the logarithmic amplifier RSSI detection branch 320 is faster, after the RSSI_Trigger signal provided by the device controller 410 is received, an output end of the logarithmic amplifier RSSI detection branch 320 generates a corresponding output signal rapidly. The comparison circuit 420 compares the output signal provided by the logarithmic amplifier RSSI detection branch 320 with a pre-configured reference signal Ref, determines whether the optical input of the optical module 200 is a large optical input or a small optical input, and outputs a corresponding selection control signal to the device controller 410. Specifically, when a value of the output signal of the logarithmic amplifier RSSI detection branch 320 is smaller than a value of the reference signal Ref, the comparison circuit 420 determines that the current optical input of the optical module 200 is a small optical input, and correspondingly outputs a selection control signal (such as a low level signal) indicating that the current optical input is a small optical input. On the contrary, when a value of the output signal of the logarithmic amplifier RSSI detection branch 320 is greater than a value of the reference signal Ref, the comparison circuit 420 determines that the current optical input of the optical module 200 is a large optical input, and correspondingly outputs a selection control signal (such as a high level signal) indicating that the current optical input is a large optical input.

The device controller 410 may obtain, according to the selection control signal received from the comparison circuit 420 by the device controller 410, optical strength information of the current optical signal received by the optical module 200, and selectively receive a measurement result of an RSSI detection branch corresponding to the optical strength information. Specifically, when the device controller 410 determines, according to the received selection control signal, that the current optical input of the optical module 200 is a small optical input, the device controller 410 may select an RSSI measurement result of the logarithmic amplifier RSSI detection branch 320; when the device controller 410 determines, according to the received selection control signal, that the current optical input of the optical module 200 is a large optical input, the device controller 410 selects an RSSI measurement result of the current mirror RSSI detection branch 310.

Step S14: The device controller samples output signals of the selected RSSI detection branch after the delay of a first preset period, to obtain RSSI information of the optical signal.

The analog-to-digital converter inside the device controller 410 starts to sample, after the delay of a first preset period TRI Width starting from the time when the device controller 410 outputs the RSSI_Trigger signal, output signals of the RSSI detection branch 310 or 320 selected in step S13 through the first detection port 411 or the second detection port 412, and convert the same into a digital quantity through analog-to-digital conversion. Further, the analog-to-digital converter may save the converted digital quantity to a storing unit inside the device controller 410, and the digital quantity may be used as RSSI information obtained in the RSSI measurement.

Step S15: The device controller reads, after the delay of a second preset period, the RSSI information.

After the delay of a second preset period Tp starting from outputting the RSSI_Trigger signal, the device controller 410 reads the RSSI information, obtained by the RSSI measurement and stored in the storing unit, by accessing an IIC interface.

Step S16: The device controller calculates a receive optical power of the optical module according to the read RSSI information.

Further, the optical line terminal 110 may read transmit optical power information which is reported by the optical network unit 120 through an OAM message, and in combination with the receive optical power information obtained in step S16, calculate an actual insertion loss of the optical distribution network. In addition, the optical line terminal 110 may also compare the calculated insertion loss value with a theoretically standard value of a system insertion loss, to further determine whether a fault occurs on the optical distribution network.

Figure 6:
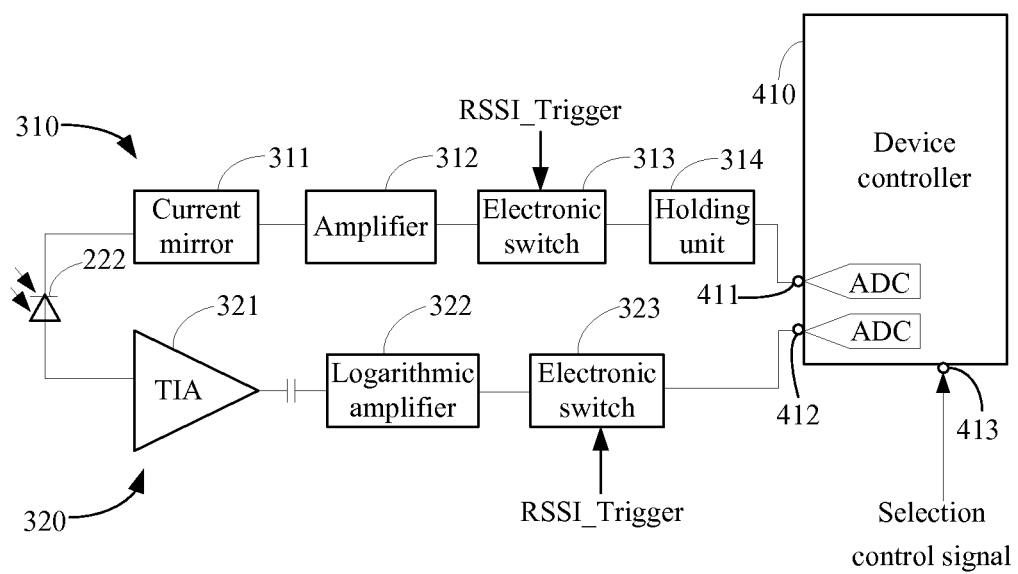
FIG. 6 is a schematic structural diagram of an optical power detecting functional part according to another embodiment of the present invention.

FIG. 6 is a schematic structural diagram of an optical power detecting functional part of an optical line terminal according to another embodiment of the present invention. The optical power detecting functional part shown in FIG. 6 is similar to the optical power detecting functional part shown in FIG. 3, which also includes the device controller 410 of the optical line terminal 110 and the detecting module 230. The main difference lies in that the optical power detecting functional part shown in FIG. 6 does not include a comparison circuit 230. Instead, in the optical power detecting part shown in FIG. 6, the selection controlling end 413 of the device controller 410 directly receives a selection control signal provided by another functional module of the optical line terminal 110, and selectively receives, according to the selection control signal, an RSSI measurement result output by a corresponding RSSI detection branch 310 or 320. For the convenience of description, the functional module that generates the selection control signal and is in the optical line terminal 110 is named as a selection control signal generating module, which may be a micro control unit or a data processing unit inside the optical line terminal 110.

The optical power detecting functional part of the optical line terminal 110 shown in FIG. 6 may also use the method for detecting an optical power shown in FIG. 5 to detect a receive optical power of the optical module 200; however, if the optical power detecting functional part uses the structure shown in FIG. 6, then, in step S13, the selection control signal is not a comparison result output by the comparison circuit 420 shown in FIG. 3 by comparing an output signal provided by the logarithmic amplifier RSSI detection branch 320 with a pre-configured reference signal Ref. Instead, in the embodiment, the selection control signal may be obtained by using a method shown in FIG. 7.

Figure 7:
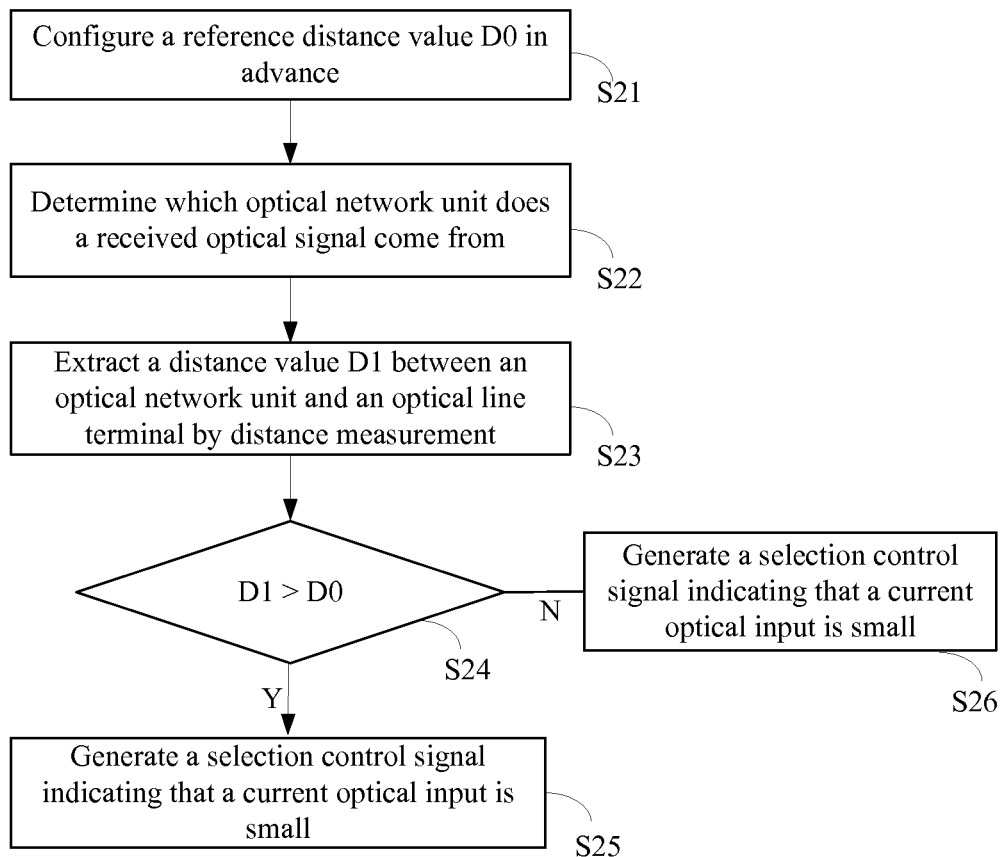
FIG. 7 shows a method for generating a selection control signal output to a device controller when a structure of an optical power detecting functional part shown in FIG. 6 is used.

Specifically, as shown in FIG. 7, firstly, a reference distance value D0 is configured in advance inside the optical line terminal 110 (step S21). When the optical module 200 of the optical line terminal 110 receives an optical signal from an optical network unit 120, the selection control signal generating module of the optical line terminal 110 may determine, according to the optical signal received by the optical module 220, information of the optical network unit 120 that sends the optical signal, that is, determine which optical network unit does the optical signal come from (step S22), and extract a distance value D1 between the optical network unit 120 and the optical line terminal 110 obtained by distance measurement in a registration process (step S23). Further, the selection control signal generating module of the optical line terminal 110 may compare the distance value D1 between the optical network unit 120 and the optical line terminal 110 with the reference distance value D0, so as to determine whether the distance value D1 is greater than the reference distance value D0 (step S24).

If the distance value D1 is greater than the reference distance value D0, a length of an optical fiber between the optical network unit 120 and the optical line terminal 110 is long, and the loss of the optical signal in a transferring process in the optical distribution network 130 is large, resulting in small optical strength of the optical signal received by the optical module 200. That is, the current optical input of the optical module 200 is a small optical input. Therefore, the selection control signal generating module of the optical line terminal 110 may generate a selection control signal indicating that optical strength of the received optical signal is small (that is, indicating that the current optical input is a small optical input), and provide the selection control signal to the device controller 410 through the selection controlling end 413, to instruct the device controller 410 to select an RSSI measurement result output by the logarithmic amplifier RSSI detection branch 320 (step S25).

If the distance value D1 is smaller than the reference distance value D0, a length of an optical fiber between the optical network unit 120 and the optical line terminal 110 is short, and the loss of the optical signal in a transferring process in the optical distribution network 130 is small, resulting in large optical strength of the optical signal received by the optical module 200. That is, the optical input of the optical module 200 is a large optical input. Therefore, the selection control signal generating module of the optical line terminal 110 may generate a selection control signal indicating that optical strength of the received optical signal is large (that is, indicating that the current optical input is a large optical input), and provide the selection control signal to the device controller 410 through the selection controlling end 413, to instruct the device controller 410 to select an RSSI measurement result output by the current mirror RSSI detection branch 310 (step S26).

Based on the above analysis, the distance value D1 between the optical network unit 120 and the optical line terminal 110 actually also reflects optical strength information of the optical signal received by the optical module 200. Therefore, generating the selection control signal according to a comparison result between the distance value D1 and the reference distance value in the embodiment is actually the same as the principle of generating the selection control signal shown in FIG. 3.

In the above step S21, the reference distance value D0 that is configured in advance may be obtained by using the following method. Firstly, in a registration process, the optical line terminal 110 obtains a distance between each optical network unit 120 and the optical line terminal 110 by performing distance measurement for each optical network unit 120. Further, before detecting an optical power, the optical line terminal 110 may use the current mirror RSSI detection branch 310 or the logarithmic amplifier RSSI detection branch 320 to roughly measure optical strength of an optical signal output by each optical network unit 120, which is registered to be online, to the optical module 200. Because the longer the distance between the optical network unit 120 and the optical line terminal 110 is, the larger the optical signal between the optical network unit 120 and the optical line terminal 110 attenuates in a transferring process in the optical distribution network 130, and the smaller the optical signal strength obtained by roughly measuring by the current mirror RSSI detection branch 310 or the logarithmic amplifier RSSI detection branch 320 is, a result of the rough measurement of the optical line terminal 110 is in one-to-one correspondence with a distance between each optical network unit 120 and the optical line terminal 110. The optical line terminal 110 may select an optical strength value within an optical strength range in which both the current mirror RSSI detection branch 310 and the logarithmic amplifier RSSI detection branch 320 may obtain preferential RSSI measurement accuracy, and select a corresponding distance value according to the correspondence as the reference distance value D0. For example, when an optical strength range of transmit light of the optical network unit 120 in the passive optical network system 100 is −31 dBm to −6 dBm, the optical line terminal 110 may select a distance value corresponding to optical strength of −20 dBm as the reference distance value D0.

In another aspect, when a new optical network unit 120 is registered to be online, the optical line terminal 110 may repeat the above two processes, and select RSSI information of an optical signal received by the optical module 200 from the optical network unit 120 that is newly brought online from an RSSI detection branch 310 or 320 that is suitable for the optical network unit 120 that is newly brought online, to detect optical strength of the optical signal after the optical signal is transferred through the optical distribution network 130 to reach the optical module 200 of the optical line terminal 110.

Through the description in the foregoing embodiments, persons skilled in the art may be clearly aware that the present invention may be implemented through software plus a necessary hardware platform, or all through hardware. Based on such an understanding, all or the part of the technical solutions contributing to the prior art may be implemented in the form of a software product. The computer software product is stored in a storage medium, such as a ROM/RAM, a magnetic disk, and an optical disk, and includes several instructions for instructing a computer device (which may be a personal computer, a server, or a network device) to perform all or a part of the methods described in the embodiments of the present invention.

The foregoing description is merely exemplary embodiments of the present invention, but is not intended to limit the protection scope of the present invention. Any variation or replacement made by persons skilled in the art without departing from the idea of the present invention fall within the scope of the present invention. Therefore, the protection scope of the present invention shall be subject to the protection scope of the claims.

What is claimed is:

1. An apparatus for detecting an optical power of a passive optical network, comprising:
    a receiving module, configured to receive an optical signal sent by an optical network unit;
    a detecting module, configured to measure an Received Signal Strength Indication (RSSI) of the received optical signal in response to a received RSSI function trigger signal, wherein the detecting module comprises a current mirror RSSI detection branch and a logarithmic amplifier RSSI detection branch, and the current mirror RSSI detection branch and the logarithmic amplifier RSSI detection branch are coupled to the receiving module; and
    a controller, coupled to the detecting module and configured to output the RSSI function trigger signal to the detecting module, selectively receive, according to a selection control signal provided by a selection control signal generating module, an RSSI measurement result output by an RSSI detection branch corresponding to optical strength of the optical signal sent by the optical network unit, and calculate optical power information of the optical signal according to the RSSI measurement result, wherein the selection control signal generating module generates the selection control signal according to a specific distance value between the optical network unit and an optical line terminal which is obtained by distance measurement.

2. The apparatus for detecting an optical power of a passive optical network according to claim 1, wherein the selection control signal generating module is coupled to the controller and is configured to generate the selection control signal according to the optical strength of the optical signal, and output the selection control signal to the controller, to instruct the controller to selectively receive an RSSI measurement result, output by the current mirror RSSI detection branch, when the optical strength of the optical signal is greater than a preset reference value, and selectively receive an RSSI measurement result, output by the logarithmic amplifier RSSI detection branch, when the optical strength of the optical signal is smaller than the preset reference value.

3. The apparatus for detecting an optical power of a passive optical network according to claim 2, wherein the selection control signal generating module comprises a comparator, wherein one input end of the comparator is coupled to an output end of the logarithmic amplifier RSSI detection branch, and another input end of the comparator is configured to receive a reference signal corresponding to the preset reference value, and the comparator is configured to compare an output signal, generated by the logarithmic amplifier RSSI detection branch in response to the RSSI function trigger signal, with the reference signal corresponding to the preset reference value, and generate the selection control signal according to a comparison result.

4. The apparatus for detecting an optical power of a passive optical network according to claim 3, wherein the reference signal is a voltage signal corresponding to an optical strength value which enables measurement errors of both the current mirror RSSI detection branch and the logarithmic amplifier RSSI detection branch to be smaller than a preset error value.

5. An apparatus for detecting an optical power of a passive optical network, comprising:
    a receiving module, configured to receive an optical signal sent by an optical network unit;
    a detecting module, configured to measure an Received Signal Strength Indication (RSSI) of the received optical signal in response to a received RSSI function trigger signal, wherein the detecting module comprises a current mirror RSSI detection branch and a logarithmic amplifier RSSI detection branch, and the current mirror RSSI detection branch and the logarithmic amplifier RSSI detection branch are coupled to the receiving module; and
    a controller, coupled to the detecting module and configured to output the RSSI function trigger signal to the detecting module, selectively receive, according to a selection control signal provided by a selection control signal generating module, an RSSI measurement result output by an RSSI detection branch corresponding to optical strength of the optical signal sent by the optical network unit, and calculate optical power information of the optical signal according to the RSSI measurement result, wherein:
    the selection control signal generating module is coupled to the controller and is configured to generate the selection control signal according to the optical strength of the optical signal, and output the selection control signal to the controller, to instruct the controller to selectively receive an RSSI measurement result, output by the current mirror RSSI detection branch, when the optical strength of the optical signal is greater than a preset reference value, and selectively receive an RSSI measurement result, output by the logarithmic amplifier RSSI detection branch, when the optical strength of the optical signal is smaller than the preset reference value; and
    the selection control signal generating module generates the selection control signal according to a specific distance value between the optical network unit and an optical line terminal which is obtained by distance measurement, that is, generates a selection control signal indicating that the optical strength of the optical signal received by the receiving module is greater than the preset reference value when the specific distance value is smaller than a reference distance value, and generates a selection control signal indicating that the optical strength of the optical signal received by the receiving module is smaller than the preset reference value when the specific distance value is greater than the reference distance value.

6. The apparatus for detecting an optical power of a passive optical network according to claim 5, wherein the reference distance value is a distance value between the optical network unit and the optical line terminal which is corresponding to an optical strength value which enables measurement errors of both the current mirror RSSI detection branch and the logarithmic amplifier RSSI detection branch to be smaller than a preset error value.

7. A method for detecting an optical power of a passive optical network, comprising:
    receiving an optical signal sent by an optical network unit;
    sending an Received Signal Strength Indication (RSSI) function trigger signal to a detecting module that at least comprises a current mirror RSSI detection branch and a logarithmic amplifier RSSI detection branch, to instruct the current mirror RSSI detection branch and the logarithmic amplifier RSSI detection branch to measure an RSSI of the received optical signal;
    receiving a selection control signal provided generated by a selection control signal generating module according to a specific distance value between the optical network unit and an optical line terminal which is obtained by distance measurement; and
    selectively receiving, according to the selection control signal, an RSSI measurement result output by an RSSI detection branch corresponding to optical strength of the optical signal sent by the optical network unit, and calculating optical power information of the optical signal according to the RSSI measurement result.

8. The method for detecting an optical power of a passive optical network according to claim 7, comprising selectively receiving an RSSI measurement result output by the current mirror RSSI detection branch under control of the selection control signal when the optical strength of the optical signal is greater than a preset reference value, and selectively receiving an RSSI measurement result output by the logarithmic amplifier RSSI detection branch under the control of the selection control signal when the optical strength of the optical signal is smaller than the preset reference value.

9. The method for detecting an optical power of a passive optical network according to claim 7, the method further comprises:
    extracting an output signal of the logarithmic amplifier RSSI detection branch in response to the RSSI function trigger signal; and
    comparing the output signal with a reference signal corresponding to the preset reference value, and generating the selection control signal according to a comparison result,
    wherein the reference signal is a signal corresponding to an optical strength value which enables measurement errors of both the current mirror RSSI detection branch and the logarithmic amplifier RSSI detection branch to be smaller than a preset error value.

10. A method for detecting an optical power of a passive optical network, comprising:
    receiving an optical signal sent by an optical network unit;
    sending an Received Signal Strength Indication (RSSI) function trigger signal to a detecting module that at least comprises a current mirror RSSI detection branch and a logarithmic amplifier RSSI detection branch, to instruct the current mirror RSSI detection branch and the logarithmic amplifier RSSI detection branch to measure an RSSI of the received optical signal;
    receiving a selection control signal provided by a selection control signal generating module;
    selectively receiving, according to the selection control signal, an RSSI measurement result output by an RSSI detection branch corresponding to optical strength of the optical signal sent by the optical network unit, and calculating optical power information of the optical signal according to the RSSI measurement result;
    obtaining a specific distance value between the optical network unit and an optical line terminal by distance measurement; and
    comparing the specific distance value with a preset reference distance value, and generating, according to a comparison result, a selection control signal for indicating the optical strength of the received optical signal;
    wherein when the specific distance value is smaller than the reference distance value, a selection control signal indicating that the strength of the received optical signal is greater than a preset reference value is generated, and when the specific distance value is greater than the reference distance value, a selection control signal indicating that the strength of the received optical signal is smaller than the preset reference value is generated.

11. The method for detecting an optical power of a passive optical network according to claim 10, further comprising configuring the reference distance value, comprising:
    performing distance measurement for each optical network unit in the passive optical network to obtain a distance value between each optical network unit and the optical line terminal;
    before detecting an optical power, using the current mirror RSSI detection branch or the logarithmic amplifier RSSI detection branch to roughly measure strength of an optical signal output by each optical network unit that is registered to be online, to obtain correspondence between optical strength and a distance value between the optical network unit and the optical line terminal; and
    selecting, according to the correspondence, a reference optical strength value within an optical strength range where measurement errors of both the current mirror RSSI detection branch and the logarithmic amplifier RSSI detection branch are smaller than a preset error value, and using a distance value corresponding to the reference optical strength value as the reference distance value.

12. An optical module, comprising:
    a receiving module, configured to receive an optical signal; and
    a detecting module, which comprises a current mirror Received Signal Strength Indication (RSSI) detection branch and a logarithmic amplifier RSSI detection branch, wherein the current mirror RSSI detection branch and the logarithmic amplifier RSSI detection branch are coupled in parallel to each other to the receiving module, and are configured to measure an RSSI of the optical signal in response to an RSSI function trigger signal received, and to selectively output according to a selection control signal an RSSI measurement result output by an RSSI detection branch corresponding to optical strength of the optical signal.

13. A passive optical network system, comprising an optical line terminal and multiple optical network units connected in a point-to-multipoint mode through an optical distribution network, wherein
    the optical network unit is configured to send an optical signal to the optical line terminal through the optical distribution network; and
    the optical line terminal is configured to receive the optical signal sent by the optical network unit, use each of an internal current mirror RSSI detection branch and a logarithmic amplifier RSSI detection branch coupled in parallel to each other in the optical line terminal to measure an RSSI of the optical signal, select according to a selection control signal an RSSI measurement result output by an RSSI detection branch corresponding to optical strength of the optical signal sent by the optical network unit, and calculate optical power information of the optical signal according to the selected RSSI measurement result.

14. The passive optical network system according to claim 13, wherein the optical line terminal comprises a receiving module, configured to receive an optical signal sent by an optical network unit;
a detecting module, configured to measure an RSSI of the received optical signal in response to a received RSSI function trigger signal,
wherein the detecting module comprises a current mirror RSSI detection branch and a logarithmic amplifier RSSI detection branch, and the current mirror RSSI detection branch and the logarithmic amplifier RSSI detection branch are coupled to the receiving module; and
a controller, coupled to the detecting module and configured to output the RSSI function trigger signal to the detecting module, selectively receive, according to the selection control signal provided by a selection control signal generating module, an RSSI measurement result output by an RSSI detection branch corresponding to optical strength of the optical signal sent by the optical network unit, and calculate optical power information of the optical signal according to the RSSI measurement result.

15. The passive optical network system according to claim 14, wherein the selection control signal generating module is coupled to the controller and is configured to generate the selection control signal according to the optical strength of the optical signal, and output the selection control signal to the controller, to instruct the controller to selectively receive an RSSI measurement result, output by the current mirror RSSI detection branch, when the optical strength of the optical signal is greater than a preset reference value, and selectively receive an RSSI measurement result, output by the logarithmic amplifier RSSI detection branch, when the optical strength of the optical signal is smaller than the preset reference value.

16. The passive optical network system according to claim 15, wherein the selection control signal generating module comprises a comparator, wherein one input end of the comparator is coupled to an output end of the logarithmic amplifier RSSI detection branch, and another input end of the comparator is configured to receive a reference signal corresponding to the preset reference value, and the comparator is configured to compare an output signal, generated by the logarithmic amplifier RSSI detection branch in response to the RSSI function trigger signal, with the reference signal corresponding to the preset reference value, and generate the selection control signal according to a comparison result.

17. The passive optical network system according to claim 15, wherein the reference signal is a voltage signal corresponding to an optical strength value which enables measurement errors of both the current mirror RSSI detection branch and the logarithmic amplifier RSSI detection branch to be smaller than a preset error value.

18. A passive optical network system, comprising an optical line terminal and multiple optical network units connected in a point-to-multipoint mode through an optical distribution network, wherein
the optical network unit is configured to send an optical signal to the optical line terminal through the optical distribution network; and the optical line terminal is configured to receive the optical signal sent by the optical network unit, use each of an internal current mirror RSSI detection branch and a logarithmic amplifier RSSI detection branch in the optical line terminal to measure an RSSI of the optical signal, select an RSSI measurement result output by an RSSI detection branch corresponding to optical strength of the optical signal sent by the optical network unit, and calculate optical power information of the optical signal according to the selected RSSI measurement result, wherein the optical line terminal comprises:
a receiving module, configured to receive an optical signal sent by an optical network unit;
a detecting module, configured to measure an RSSI of the received optical signal in response to a received RSSI function trigger signal,
wherein the detecting module comprises a current mirror RSSI detection branch and a logarithmic amplifier RSSI detection branch, and the current mirror RSSI detection branch and the logarithmic amplifier RSSI detection branch are coupled to the receiving module; and
a controller, coupled to the detecting module and configured to output the RSSI function trigger signal to the detecting module, selectively receive, according to a selection control signal provided by a selection control signal generating module, an RSSI measurement result output by an RSSI detection branch corresponding to optical strength of the optical signal sent by the optical network unit, and calculate optical power information of the optical signal according to the RSSI measurement result, wherein:
the selection control signal generating module is coupled to the controller and is configured to generate the selection control signal according to the optical strength of the optical signal, and output the selection control signal to the controller, to instruct the controller to selectively receive an RSSI measurement result, output by the current mirror RSSI detection branch, when the optical strength of the optical signal is greater than a preset reference value, and selectively receive an RSSI measurement result, output by the logarithmic amplifier RSSI detection branch, when the optical strength of the optical signal is smaller than the preset reference value; and
the selection control signal generating module generates the selection control signal according to a specific distance value between the optical network unit and an optical line terminal which is obtained by distance measurement, that is, generates a selection control signal indicating that the optical strength of the optical signal received by the receiving module is greater than the preset reference value when the specific distance value is smaller than a reference distance value, and generates a selection control signal indicating that the optical strength of the optical signal received by the receiving module is smaller than the preset reference value when the specific distance value is greater than the reference distance value.

19. The passive optical network system according to claim 18, wherein the reference distance value is a distance value between the optical network unit and the optical line terminal which is corresponding to an optical strength value which enables measurement errors of both the current mirror RSSI detection branch and the logarithmic amplifier RSSI detection branch to be smaller than a preset error value.

* * * * *